United States Patent Office 3,264,558
Patented August 2, 1966

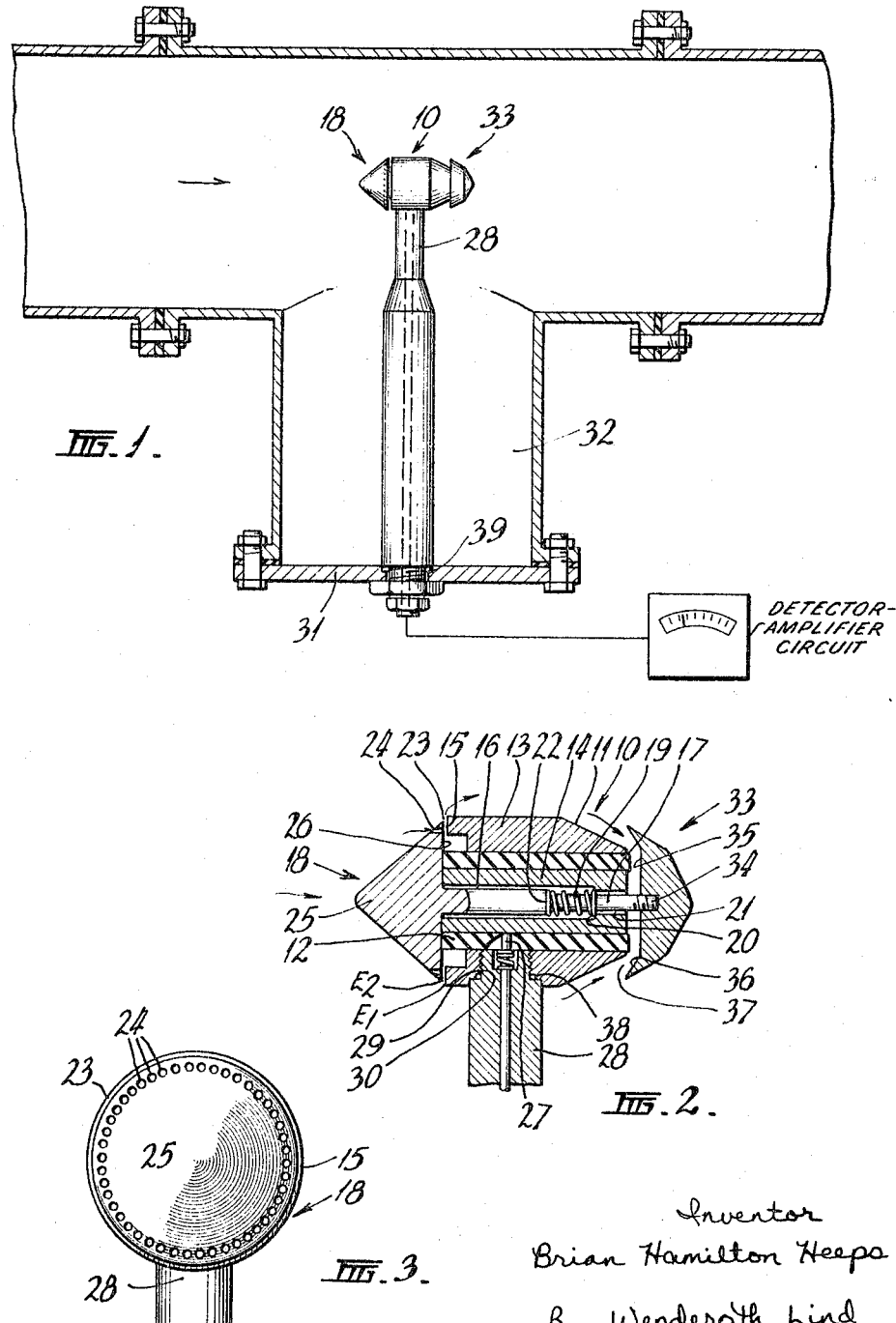

3,264,558
MOVABLE ELECTRODE APPARATUS FOR DETECTING THE PRESENCE OF MICRO-PARTICLES OF LIQUID SUSPENDED IN A FLUID
Brian Hamilton Heeps, 26A Alfada St., South Caulfield, Victoria, Australia
Filed May 14, 1963, Ser. No. 280,398
12 Claims. (Cl. 324—65)

This application is a continuation-in-part of my copending application Serial No. 157,888, filed December 6, 1961.

This invention relates to apparatus for use in the detection of small suspended quantities of liquid in a medium having, relative to the medium, a comparatively high resistivity. The invention is more particularly concerned with the detection of suspended water droplets in hydrocarbon fuel when the water is present as a mist of minute droplets or micro-particles, but the invention may also be applied to detect the presence of suspended water in a gaseous fluid such as air.

The detection and measurement of small amounts of water in other liquids has usually been approached by chemical means. One such means is that based on the reaction of pyridene with iodine and sulphur dioxide in the presence of water, and this technique can be used to detect the total amount of water in a given system. If this method is coupled with adequate filtration techniques, it can be used to detect water that is actually dissolved in the other liquid, and the difference between the total and dissolved water can be used as a measure of the free or undissolved water. Qualitative detection of water at varying sensitivities is also possible using chemicals which change colour when reacted with sufficient water.

The direct detection and measurement of the free water alone is not possible by these chemical methods. Visual inspection can detect cloudiness due to this free water from about 40 parts per million upwards if the water is distributed as fine droplets.

The detection of small amounts of free water in hydrocarbon mixtures has assumed an increased importance with the expansion of their use as aviation fuel. The lowering of temperature during high altitude flights can lead to the precipitation of water from fuels as the solubility decreases. Because of the need to minimise the water content of the fuel, it is very desirable to detect and reject any fuels which already contain free water at the fuelling stage.

Now it is an object of the present invention to provide an improved apparatus for detecting the presence of a liquid in a fluid and more particularly water in a hydrocarbon fuel, the apparatus being readily placed in a fluid flow line and being coupled to a meter whereby readings of the water content may be taken.

In accordance with the invention there is provided an improved apparatus for detecting or detecting and measuring during flow in a pipe line the presence of micro-droplets of water in a fluid of high resistivity relative to the liquid, particularly water in a hydrocarbon fuel, said apparatus comprising a body, a sensing nozzle mounted in front of said body and a baffle mounted at the rear of said body, said sensing nozzle and baffle being connected whereby movement of the one in one direction causes corresponding movement of the other in the same direction; said sensing nozzle being provided with a plurality of holes which pass from the front to the back face thereof and which are arranged so that when the apparatus is in use, said holes are substantially in line with the direction of fluid flow, the rear face of said sensing nozzle comprising an electrode and the front face of said body comprising another electrode, said electrodes being insulated and spaced one from the other by a distance such that the liquid entering the holes during flow will cause micro-droplets of suspended water in the liquid or air to form bridges between said spaced electrodes, thereby lowering the electrical resistance therebetween, said electrodes being adapted to be connected to an electrical device having an output dependent upon the resistance between said electrodes.

More particularly, the sensing nozzle and body are arranged so that the fluid or air entering the holes in the nozzle is caused to turn at an angle transverse to the direction of normal fluid flow, the arrangement being such that the micro-droplets of water which enter through the holes in the nozzle tend to agglomerate as the main medium changes its direction of flow, thereby forming the bridge or bridges between the electrodes.

Other objects and features of the invention will become apparent from the ensuing description of a preferred embodiment of the invention wherein reference is made to the accompanying drawings in which:

FIGURE 1 is an elevational view of the apparatus as arranged in a typical fuel line,
FIGURE 2 is a cross-sectional elevational view of the apparatus, and
FIGURE 3 is an end elevational view looking at the front of the apparatus.

The apparatus illustrated is particularly adapted for placement in a fluid flow line, and in describing the preferred embodiment it will be assumed that the fluid is a hydrocarbon fuel and the liquid is water. It is to be understood, however, that the invention is not limited in its use to the mediums.

A detector comprises a body 10 which is substantially cylindrical but wherein the rear portion 11 is frusto-conical. The body 10 is formed with an insulator 12 dividing the outer part 13 from the inner part 14. The front 15 of the outer part 13 forms an electrode $E_1$. The centre body is provided with an axial bore metal bushing 16 which receives a stem 17 of a nozzle 18. A compression spring 19 is arranged on the stem 17 so as to abut at one end against a shoulder 20 formed by a narrowing 21 of the bore 16 and at the other end against a shoulder 22 on the stem 17.

The sensing nozzle 18 is provided near its periphery 23 with a plurality of holes 24 which pass from the front of the nozzle to the rear face thereof. The front 25 of the nozzle 18 is conical and the rear face 26 thereof is flat. The rear face 26 of the nozzle forms another electrode $E_2$.

A baffle 33 is affixed to the rear end 34 of the stem 17 which protrudes rearwardly of the body 10. The baffle 33 comprises a flat forward face 35 which abuts against the rear insulated section 12 of the body 10 when the detector is inoperative. The face 35 is forwardly inclined near its outer edge 36, although not to such an extent as to contact the frusto-conical portion 11 of the body. The face 35 is inclined sufficiently to form a funnel or scoop whereby some of the fuel passing the detector is caused to enter this annular space 37 between the face 35 and the frusto-conical portion 11. The fuel thus directed into this space causes the baffle to be withdrawn to its rearmost position and thereby assists in drawing the rear face 26 of the nozzle against the insulated raised section 12 of the body 10.

The rear face 26 of the sensing nozzle 18, when brought against the insulated section 12 of the body 10, forms a pre-set gap between 15 ($E_1$) and 26 ($E_2$). The inner part 14 is connected by a contact spring 27 carried on the end of a support 28. The support 28 is screw threaded at its upper end 29 for engagement with a correspondingly threaded recess 30 in the body 10 ($E_1$). The probe contact 27 carries wiring for $E_2$ so as the electrical resistance can be measured by an electrical device.

The support 28 is adapted for fixture to a plate 31 closing an inspection opening 32 in the pipe line. In order to attach the support 28, it is only necessary to drill a suitable opening in the plate 31. The length of the support 28 is such as to position the detector centrally in the pipe line.

The contact probe 27 is spring loaded in the end of the support arm 28 so as to maintain contact with the inner part 14 of the body, and enable a small current to be conducted to the sensing nozzle $E_2$.

The support arm 27 is provided with ring seals 38 and 39 at its places of connection with the body of the detector, and the inspection opening cover plate 31 whereby fluid tight seals are ensured.

In operation, the detector mounted on the support 28 is screwed into the opening in the plate 31 and aligned in the fuel line so as to be centrally located therein and substantially in line with the direction of fluid flow. Whilst the fluid is stationary and before fluid flow takes place, the nozzle electrode 18 is spaced from the front of the body a distance equal to the free movement of the stem 17, that is, a distance which provides maximum free space between the front of the body 10 and the rear face 26 ($E_1$) of the nozzle. The sensing nozzle is maintained in this open position by means of the force exerted by the spring 19.

When fluid flow commences, the pressure of the fluid on the nozzle 18 combined with the force exerted on the face 36 of the baffle 33 overcomes the compressive force of the spring 19 and the nozzle is brought against the raised insulated section 12 of the body 10. Owing to the inner part 12 and 14 of the body 10 protruding forward at a pre-arranged amount from the front of the body, a gap is provided between the rear face 26 ($E_2$) of the nozzle and the face 15 ($E_1$) of the body. The width of this gap is predetermined according to particular requirements. When the fluid flow ceases and pressure is no longer applied to the nozzle 18 and baffle 33, the compression spring pushes the nozzle to its foremost position thereby opening the gap to its fullest extent. By this arrangement any particulate matter which may have been retained within the gap is released and the detector is thus self cleaning.

In hydrocarbon fuel it is usual to filter particulate matter to a size not exceeding six microns or less, and any stray particulate matter which may be in the fuel can therefore pass through the gap without effecting the sensing section. Normal residual traces in the fuel are usually non-conductive, and thus these also pass easily through the gap.

As the fluid flows around the detector, a certain amount is caused to enter the detector gap through the holes 24 in the nozzle 18. Fluid which enters through the holes 24 is forced to turn at right angles immediately on passing through the holes, and thus the fluid passes through the gap between the rear face 26 of the nozzle and the front face 15 of the body. As the rear face 26 of the nozzle constitutes one electrode $E_2$ and the face 15 of the body constitutes the other electrode $E_1$, the fluid which enters the holes 24 also passes between the electrodes before re-entering the main stream. Owing to the right angled turning of the fluid, any water present having a droplet size less than the gap setting is caused to a coalesce and thereby conductive linkages are built up across the gap. The build up of these water linkages is entirely dependent upon the amount of suspended water (within a given droplet size) reduced by filtration, which means in effect that the thickness of the conductive linkages formed is dependent on the droplet size and the resistance offered by such linkage is proportionate to the amount of linkages formed and maintained during flow. That is, the lesser the amount within a given droplet size, the thinner the linkage, and thus the higher the electrical resistance.

The apparatus of this invention detects the presence of free water in hydrocarbon mixtures at concentrations as low as five parts per million, and it is based on the electrical conductivity of water linkages formed within the gap being higher than the hydrocarbon liquid.

A small D.C. voltage is applied across the two electrodes $E_1$ and $E_2$. As the fluid passes through the holes 24 and gap between the electrodes, the right angled turning causes the tiny water droplets to build up small water bridges across the gap with resistances of the order of $10^8$ ohm. When the electrode gap is bridged by these high resistance links, a very small current passes through the wiring in the support arm 28, thus causing a larger current flow in a detector circuit. This current is then amplified to give a reading on a suitable ammeter or other indicator. The readings on the meter are proportional to the water conductance between the electrodes $E_1$ and $E_2$, and this leads to a measure of the suspended water content of the liquid system. The apparatus is not wholly dependent on the presense of water droplets large enough to bridge the electrode gap as it can detect water in a very fine state of dispersion down to concentrations as low as 5–10 parts per million. These tiny droplets adhere to the charged electrodes and build on to each other until the gap is bridged.

Reading of the meter is not at all complicated, as regardless of the cause of current flow in the detector circuit this cause can be determined from the distinctive reading on the meter. For instance, if conductive particulate material is present in the fluid and such material is of a particle size as large as or larger than the electrode gap setting, its lodgement in the gap would be noticed by a distinctive reading on a lower resistance scale on the meter.

When water is present in large droplets, i.e., larger than the gap setting, the presence of such water in the gap is also shown as a distinctive reading on a lower resistance scale. If desired or if necessary, the electrode gap setting can be calibrated to cope with large droplets.

With a gap setting of .002" (approximately 50 microns), any water present in small droplets, i.e., 6 microns or less, in the final stage of filtration, the build up of such droplets in the electrode gap is shown only on a very high resistance scale on the ammeter.

It will thus be seen that a very ready distinction between the three abovementioned conditions is obtainable.

According to a modification of the invention, the spring operation of the sensing nozzle can be used for opening the gap during flow by providing a solenoid which may be used to assist in clearing any temporary bridging of the gap during fluid flow.

A spring could then be used to maintin the electrode gap at its operating setting.

It will thus be seen from the abovementioned description that I have provided an apparatus which is an improvemet on the apparatus described in my patent application Serial Number 157,888.

I claim:

1. An improved apparatus for detecting, or detecting and measuring, the presence of micro-droplets of water in a fluid of high resistivity relative to the liquid, particularly micro-droplets of water suspended in a hydrocarbon fuel; said apparatus comprising a body, a sensing nozzle mounted in front of said body and a baffle mounted on the rear of said body, said nozzle and baffle being connected to each other for simultaneous movement along an axis through said body whereby movement of the one in one direction causes corresponding movement of the other in the same direction; said nozzle being provided with a plurality of holes which pass from the front to the back face thereof and extending in a direction parallel to said axis, the rear face of said nozzle comprising an electrode and the front face of said body comprising another electrode, said electrodes being spaced one from the other by a distance such that the liquid entering the said holes may cause water suspensions to form a bridge or bridges between said spaced electrodes, thereby lowering the electrical resistance between said electrodes and an electrical device having an output dependent upon the resistance between said electrodes and to which said electrodes are electrically connected.

2. An apparatus as claimed in claim 1, characterized in that the said holes in said sensing nozzle are transverse to the front face of said body so that fluid entering said holes in the nozzle is caused to turn at an angle transverse to the direction of the normal fluid flow, the arrangement being such that the micro-droplets of suspended water which enter the holes tend to agglomerate as the fluid changes its direction of flow, thereby forming the bridge or bridges between the electrodes.

3. An apparatus as claimed in claim 1 wherein the body has an inner part and an outer part, said inner and outer parts being separated by electrically insulating material.

4. An apparatus as claimed in claim 3 wherein the inner part projects slightly forwardly of the outer part at the front face of said body, said forwardly projecting part providing a stop for the nozzle and being the means by which the electrode gap is set.

5. An apparatus as claimed in claim 3 wherein the inner part is provided with metal bushing, and wherein the nozzle is provided with a stem which passes through said bushing for connection to the baffle on the rear of the body, electrical contact being made by spring contact to said bushing.

6. An apparatus as claimed in claim 5 wherein a compression spring is provided on the stem, said spring bearing on said body and tending to urge the nozzle forwardly from the body and thereby opening the electrode gap after flow.

7. An apparatus as claimed in claim 6 wherein the force of the spring is less than the pressure of fluid on the nozzle when fluid is flowing past the apparatus in a direction from the front to the rear of said apparatus.

8. An apparatus as claimed in claim 6 wherein the baffle has an extension thereon extending beyond the peripheral surface of said body whereby fluid flowing past the apparatus in the direction from the front to the rear of said apparatus causes the baffle to move to its rearmost position with respect to the body, thereby causing the nozzle to move rearwardly until it abuts the forward projection of the inner insulated part of said body and overcoming the compressive force of the spring.

9. An apparatus as claimed in claim 6, including a solenoid in the said body engageable with said connected nozzle and baffle and assisting the said spring to open the electrode gap, said solenoid also being adapted only to open the electrode gap from its operative setting during fluid flow for flushing clean.

10. An apparatus as claimed in claim 1 wherein the outer part of the body has a screw threaded recess receiving a correspondingly threaded end of a support arm.

11. An apparatus as claimed in claim 10 wherein the support arm has means thereon for attachment to a pipe line inspection opening cover plate, said support arm being of a length such as to position the said body, nozzle and baffle substantially centrally in the pipe line.

12. An apparatus as claimed in claim 11 wherein the support arm comprises a contact probe on the end of said arm which is received in the threaded recess in said body, said probe being electrically connected to the sensing nozzle electrode to convey minute electrical current from this electrode to a detector circuit, the second electrode being grounded.

References Cited by the Examiner

UNITED STATES PATENTS 2,769,140 10/1956 Obenshain.
2,807,956 10/1957 Doble _____ 324—61 X

FOREIGN PATENTS 81,966 7/1956 Netherlands.

WALTER L. CARLSON, *Primary Examiner.*

E. E. KUBASIEWICZ, *Assistant Examiner.*